Feb. 22, 1927.  1,618,854
C. H. WORTH
SHOPPING BAG
Filed June 18, 1925   2 Sheets-Sheet 1
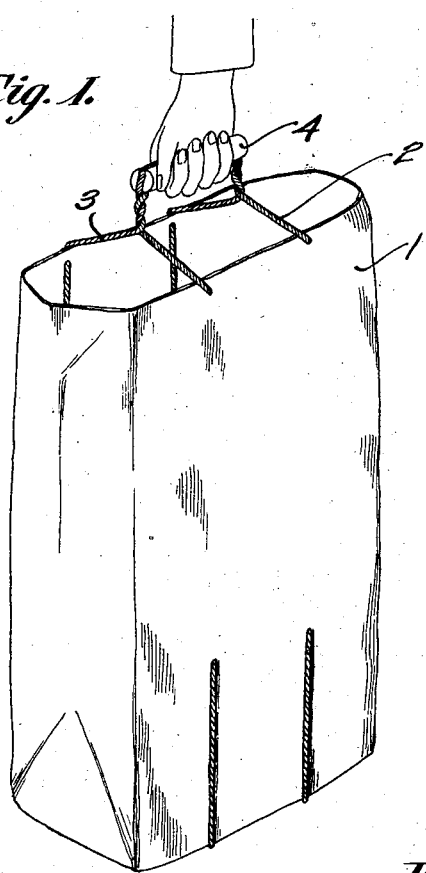
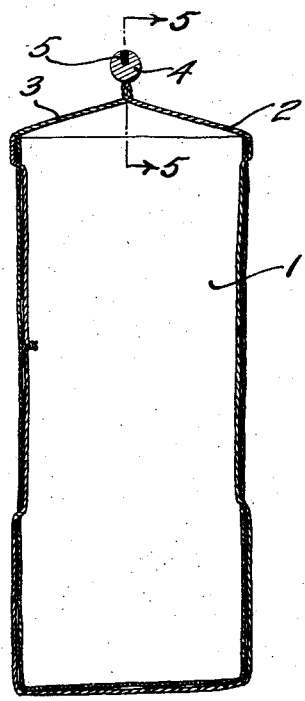
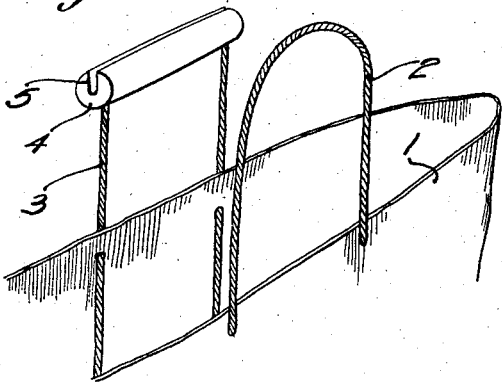
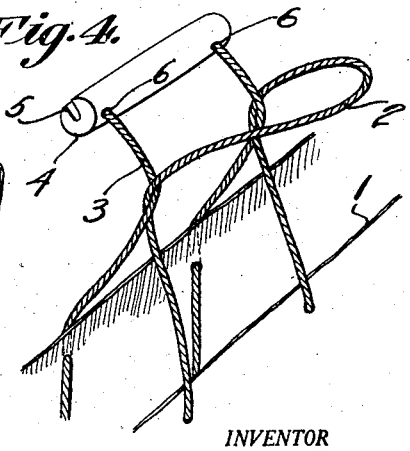
WITNESSES:
Evelyn Crompton
George A. Gruss
INVENTOR
Charles H. Worth
BY
Joshua R. H. Potts
HIS ATTORNEY Feb. 22, 1927.
C. H. WORTH
SHOPPING BAG
Filed June 18, 1925
1,618,854
2 Sheets-Sheet 2
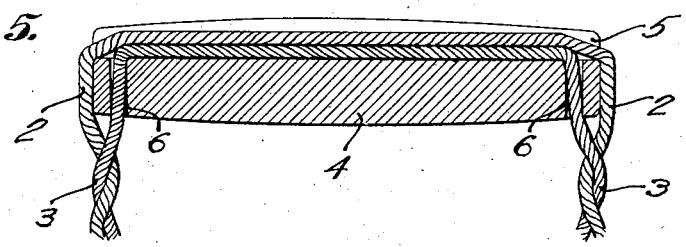
Fig. 5.
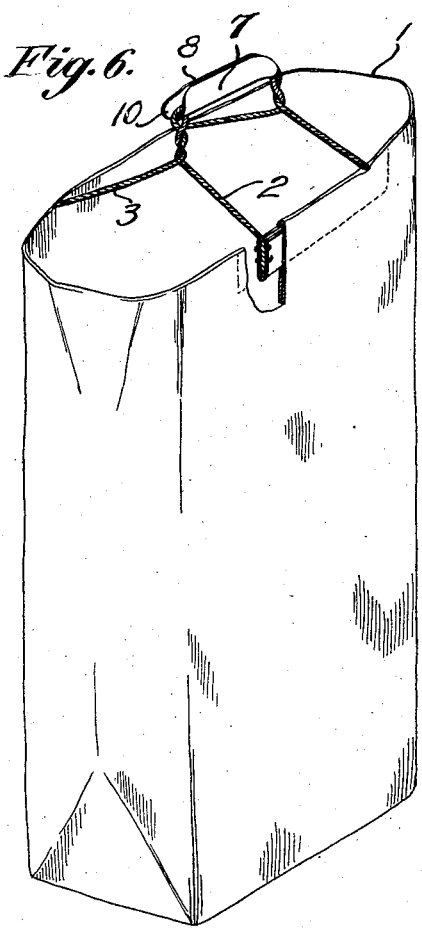
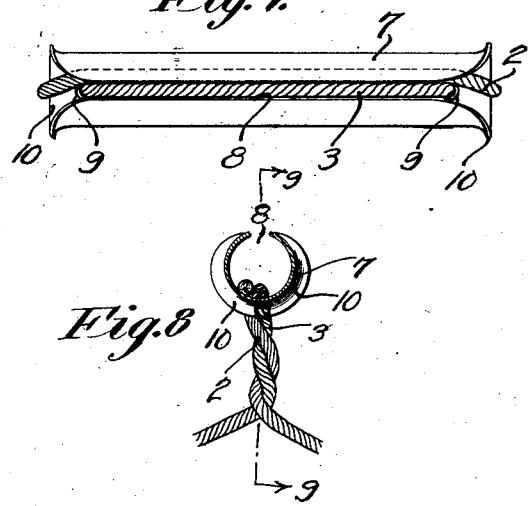
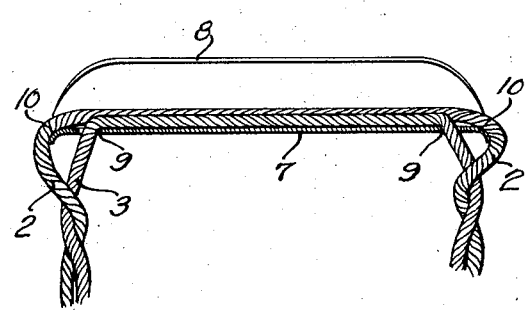
Fig. 9.
WITNESSES:
Evelyn Crompton
George A. Gruss
INVENTOR
Charles H. Worth
BY
Joshua R.H. Potts
HIS ATTORNEY Patented Feb. 22, 1927.

1,618,854

UNITED STATES PATENT OFFICE.

CHARLES H. WORTH, OF ELBERON, NEW JERSEY.

SHOPPING BAG.

Application filed June 18, 1925. Serial No. 37,909.

My invention relates to shopping bags and more particularly to the handle.

The ordinary looped cords which form the handle of a shopping bag are objectionable because the sidewise and downward pull on the cords presses them deeply into the palm of the hand and makes them uncomfortable for carrying a bag and often injurious to the hand.

The objects of my invention are to provide a handle of strong, simple and inexpensive construction with which a full and heavy bag may be conveniently carried and with which the looped cords may be quickly connected for carrying the bag.

These objects, and other advantageous ends which will be described hereinafter, I attain in the following manner, reference being had to the acompanying drawings in which—

Figure 1 is a perspective view of a handle made in accordance with my invention illustrating it attached to a bag, Figure 2 a central section through the bag shown in Figure 1, Figure 3 a fragmentary perspective view of the handle in a detached position, Figure 4 a similar view illustrating one step of attaching the handle for carrying the bag, Figure 5 an enlarged section on line 5—5 of Figure 2, Figure 6 a perspective view of a modified form of handle illustrating it attached to another type of bag, Figure 7 a plan view of the handle shown in Figure 6, Figure 8 a cross section through the handle shown in Figure 7, and Figure 9 a section on line 9—9 of Figure 8.

Referring to the drawings, 1 indicates a bag, 2 a looped cord attached to one side of the bag, 3 another looped cord attached to the other side of the bag, and 4 my improved handle attached to the looped cords. The handle shown in Figures 1–5 is made of wood or composite matter and has a groove 5 extending from end to end and a pair of openings 6 near the opposite ends of the handle communicating with the groove. The looped cord 3 passes through openings 6 and within the groove as shown in Figure 5.

The handle 7 shown in Figures 6 to 9 is stamped from sheet metal into a tubular body having a slit 8 in its top and a pair of openings 9 in its bottom. The looped cord 3 passes through the openings 9 and within the tubular body. The ends 10 of the handle are preferably flared to provide curved bearing faces for the loops.

To carry a full bag, looped cord 3, having the handle thereon, is twisted around looped cord 2 as shown in Figure 4, and the end of loop 2 is placed in groove 5 of the handle shown in Figure 5 and passed through slit 8 into the tubular body of the handle shown in Figure 9.

The handle connected with the loops in this manner is convenient to grip with the hand and comfortable for carrying a full and heavy bag and has little wearing effect upon the looped cords.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In combination with the looped cords of a shopping bag, a hollow handle having a slit and openings communicating with its interior, one of the looped cords being in the handle and passing out through the openings, and the other looped cord resting within the handle and passing out through its ends and adapted to be removed from the handle through the slit.

2. In combination with the looped cords of a shopping bag, a handle having a longitudinal groove therein and openings communicating with the groove, one of the looped cords being in the groove and passing out through the openings, and the other looped cord resting in the groove and passing out over the ends of the handle and adapted to be removed from the groove.

3. In combination with the sides of a container, looped cords attached to each side, and a handle secured to one of the looped cords through apertures adjacent the ends of the handle and adapted to removably receive the other looped cord over the ends of the handle.

4. In combination with a bag, a looped cord secured to each side, and a handle secured to one of the looped cords through openings in the sides thereof adjacent the ends of the handle and adapted, when the cords are twisted around each other, to removably receive the other looped cord.

5. In combination with the sides of a bag, a looped cord secured to each side, and a handle having a groove and openings communicating with the groove, one of the looped cords being in the groove and passing out through the openings and the other looped cord being adapted, when the cords are twisted around each other, to be placed within the groove.

In testimony whereof I have signed my name to this specification.

CHARLES H. WORTH.